Patented Mar. 3, 1931

1,794,805

UNITED STATES PATENT OFFICE

CHARLES J. STROSACKER, HAROLD KENDALL, CHESTER C. KENNEDY, AND EARL L. PELTON, OF MIDLAND, MICHIGAN, ASSIGNORS TO THE DOW CHEMICAL COMPANY, OF MIDLAND, MICHIGAN, A CORPORATION OF MICHIGAN

INDIGO POWDER AND METHOD OF MAKING SAME

No Drawing.   Application filed December 4, 1925.   Serial No. 73,247.

As is well known, indigo (and reference is herein made primarily to the synthetic product) has for many years been marketed in paste form, such indigo paste containing approximately eightly per cent of water. Obviously, a considerable saving in bulk and weight would be achieved, as well as convenience of handling if the product were in dry, i. e., powdered form. As a matter of fact, the product has been marketed in this form. However, serious objection has arisen to the use of such powder or dry indigo in that it is difficult to mix with water, the individual particles not being easily wetted.

The object of the present invention, accordingly, is to produce a powdered or dry indigo that may be readily admixed with water, the particles being easily dispersed and wetted in contra-distinction to the product as heretofore made. This we accomplish, briefly, by intermixing with the indigo a suitable deflocculating agent and spreader; and as will be readily understood the use of the latter is found of advantage not only with indigo, proper, but also with the various derivatives thereof that are utilized as dyes (e. g. brom-indigoes), as well as with other dyes that are capable of being dried to a powder (e. g. indanthrene). Indeed, the particular combination of ingredients constituting the present improved deflocculating agent and spreader may be regarded as of general utility for the purpose indicated.

To the accomplishment of the foregoing and related ends, the invention then consists of the steps and ingredients hereinafter fully described and particularly pointed out in the claims the following description setting forth in detail but several of the various ways in which the principle of the invention may be used.

As noted above, we have observed that the difficulty in the use of the powdered or dry indigo is evidently attributable in part to the behavior of the individual particles which show a tendency to cluster or lump together, however fine such individual particles may be. At the same time, the individual particles, when thus lumped together or agglomerated, are not readily wetted so as to produce a uniform suspension of the particles in water.

We have found that by adding a relatively small amount of a deflocculating agent and, in addition thereto, a correspondingly small amount of a suitable spreader, the behavior of the dry indigo particles is radically changed. In other words, such particles are easily dispersed in the water suspension and surfaces thereof are no longer repellent to the water but wet easily.

For such deflocculating agent, we may employ various substances capable of serving as a protective colloid for the particles of dry indigo. Thus, gelatin, casein, egg albumin, or their hydrolysis products have been found satisfactory substances for deflocculating agents. All of these may be generally designated as relatively chemically inert colloids of organic origin.

We have also found that a small percentage of an alkali metal hydroxide, either caustic soda or caustic potash, may be effectively employed in this connection, as well as the carbonate of sodium or potassium, although such carbonate is not quite so efficient as the caustic.

As a third ingredient, we employ a water soluble vegetable oil, for example, the product known to the dyeing trade as "Monopole". There are several such water soluble vegetable oils at present on the market which may be satisfactorily employed for the present purpose, including Turkey red oil which should, however, first be treated with alkali-metal hydroxide or carbonate to convert the free acid to an alkali metal salt. Emulsifying substances of this type we shall designate as spreaders, and for conciseness, we shall include under the generic expression "dispersing agent" these or any of the agents discussed above.

As a specific example of our improved composition, we add to powdered dry indigo one per cent, each, of gelatin, caustic soda, and "Monopole" oil. Such percentage is figured on a dry basis, but the ingredients in question are preferably added to the indigo while still in paste form. They may thus be much more thoroughly intermingled with the particles of indigo and when the product is finally dried and powdered such indigo particles will have intimately associated therewith both the deflocculating agent and the spreader provided by the present formula.

As previously indicated, such formula is of equal advantage when employed with a brominated indigo as with the straight indigo dye in powder form. The term "indigo" as found herein will accordingly be understood to connote any such dyestuff, whether indigo or a derivative thereof. Likewise it improves the wetting quality of various dyes other than those derived from indigo, but which like the latter are capable of forming a powder when dry. Finally, such formula, or combination of ingredients, is presented as possessing novelty in itself, irrespective of whether it be thus employed with a dyestuff or other powdered chemical which requires to be admixed with water for use.

Other modes of applying the principle of our invention may be employed instead of the one explained, change being made as regards the composition and method herein disclosed, provided the ingredients or steps stated by any of the following claims or the equivalent of such stated ingredients or steps be employed.

We therefore particularly point out and distinctly claim as our invention:—

1. In the preparation of indigo powder, the steps which consist in intermixing with indigo paste a dispersing agent including a spreader, and then drying.

2. In the preparation of indigo powder, the steps which consist in intermixing with indigo paste a deflocculating agent and a spreader, and then drying.

3. In the preparation of indigo powder, the steps which consists in intermixing with indigo paste a colloidal substance derived from the group consisting of gelatine, casein, and albumen, and a spreader, and then drying.

4. In the preparation of indigo powder, the steps which consist in intermixing with indigo paste gelatine, an alkali and a water-soluble vegetable oil, and then drying.

5. In the preparation of indigo powder, the steps which consist in intermixing with indigo paste gelatine, a caustic alkali and "Monopole" oil, and then drying.

6. In the preparation of indigo powder, the steps which consist in intermixing with indigo paste approximately one (1) per cent. each of gelatine, a caustic alkali and a water-soluble vegetable oil, figured on a dry basis, and then drying.

7. The herein described product comprising indigo and a dispersing agent including a spreader intermixed therewith, the percentage of said spreader being relatively small.

8. The herein described product comprising indigo and a deflocculating agent and spreader intermixed therewith, the percentage of said agent and spreader together being relatively small.

9. The herein described product comprising indigo and a deflocculating agent and spreader intermixed therewith, the amount of said agent and spreader being less than ten (10) per cent. of the amount of dry indigo.

10. The herein described product comprising dry indigo powder and a dispersing agent including a spreader intimately associated with the particles of said powder, the percentage of said spreader being relatively small.

11. The herein described product comprising dry indigo powder and a deflocculating agent and spreader intimately associated with the particles of said powder, the amount of said agent and spreader together being less than ten (10) per cent. of the amount of dry indigo.

12. The herein described product comprising dry indigo powder having intimately associated with the particles thereof a colloidal substance derived from the group consisting of gelatine, casein and albumen, and a spreader.

13. The herein described product comprising dry indigo powder and gelatine, an alkali and a water-soluble vegetable oil intimately associated with the particles of said powder.

14. The herein described product comprising dry indigo powder and approximately one (1) per cent. each of gelatine, a caustic alkali "Monopole" oil intimately associated with the particles of said powder.

Signed by us this 1st day of December, 1925.

CHARLES J. STROSACKER.
HAROLD KENDALL.
CHESTER C. KENNEDY.
EARL L. PELTON.